US012073280B2

(12) United States Patent
Kuriyama (10) Patent No.: US 12,073,280 B2
(45) Date of Patent: Aug. 27, 2024

(54) IC CARD, IC CARD PROCESSING SYSTEM, AND COMPUTER-READABLE STORAGE MEDIUM

(71) Applicants: KABUSHIKI KAISHA TOSHIBA, Tokyo (JP); Toshiba Infrastructure Systems & Solutions Corporation, Kawasaki (JP)

(72) Inventor: Ryouichi Kuriyama, Yokosuka Kanagawa (JP)

(73) Assignees: Kabushiki Kaisha Toshiba, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 0 days.

(21) Appl. No.: 17/867,971

(22) Filed: Jul. 19, 2022

(65) Prior Publication Data

US 2022/0350975 A1 Nov. 3, 2022

Related U.S. Application Data

(63) Continuation of application No. PCT/JP2021/001318, filed on Jan. 15, 2021.

(30) Foreign Application Priority Data

Jan. 20, 2020 (JP) ................. 2020-006640

(51) Int. Cl.
*G06K 7/10* (2006.01)
*G06K 19/07* (2006.01)

(52) U.S. Cl.
CPC ..... *G06K 7/10227* (2013.01); *G06K 19/0719* (2013.01)

(58) Field of Classification Search
CPC ........... G06K 7/10227; G06K 19/0719; G06K 7/0004; G06F 3/0604; G06F 3/0661;
(Continued)

(56) References Cited

U.S. PATENT DOCUMENTS

2003/0073440 A1 4/2003 Mukherjee et al.
2010/0088534 A1* 4/2010 Watanabe .......... G06K 19/0701
257/679
(Continued)

FOREIGN PATENT DOCUMENTS

EP 2 461 640 A1 6/2012
JP 2006-236200 A 9/2006
(Continued)

OTHER PUBLICATIONS

Japan Patent Office, International Search Report in PCT/JP2021/001318 (Mar. 9, 2021).
(Continued)

*Primary Examiner* — Matthew Mikels
(74) *Attorney, Agent, or Firm* — Finnegan, Henderson, Farabow, Garrett & Dunner, LLP (57) ABSTRACT

According to an embodiment, an IC card includes a communication interface and a processor. The communication interface communicates with an IC card processing apparatus. The processor transmits extended format support information indicating whether an extended format is supported for each of commands to the IC card processing apparatus.

10 Claims, 6 Drawing Sheets

(58) Field of Classification Search
CPC ........ G06F 3/0679; G06F 3/08; G07F 7/0873; G07F 7/10
See application file for complete search history.

(56) References Cited

U.S. PATENT DOCUMENTS

| | | |
|---|---|---|
| 2013/0318281 A1 | 11/2013 | Fujimoto et al. |
| 2015/0351113 A1 | 12/2015 | Takeda |
| 2020/0244458 A1* | 7/2020 | Kanbe ................... G06F 3/0637 |
| 2021/0183168 A1 | 6/2021 | Higuchi et al. |

FOREIGN PATENT DOCUMENTS

| | | |
|---|---|---|
| JP | 2012-178132 A | 9/2012 |
| JP | 5214520 B2 | 6/2013 |
| JP | 2003-288561 A | 10/2013 |
| JP | 6325355 B2 | 5/2018 |
| JP | 2019-23873 A | 2/2019 |
| WO | WO 2017/168763 A1 | 10/2017 |

OTHER PUBLICATIONS

European Patent Office, Supplementary European Search Report, 10 Pages (Dec. 11, 2023).

Intellectual Property Office of Singapore, Search Report and Written Opinion in SG Application No. 11202251339B, 8 Pages (May 15, 2024).

* cited by examiner

IC CARD, IC CARD PROCESSING SYSTEM, AND COMPUTER-READABLE STORAGE MEDIUM

CROSS REFERENCE TO RELATED APPLICATIONS

This application is a Continuation Application of PCT Application No. PCT/JP2021/001318, filed Jan. 15, 2021 and based upon and claiming the benefit of priority from Japanese Patent Application No. 2020-006640, filed Jan. 20, 2020, the entire contents of all of which are incorporated herein by reference.

FIELD

Embodiments described herein relate generally to an IC card, an IC card processing system, and a computer-readable storage medium.

BACKGROUND

IC cards (portable electronic devices) have been put to practical use. Each of such IC cards includes an IC chip including a processor, a non-volatile memory, and a RAM (Random Access Memory), and a communication interface.

IC cards execute various types of processing by transmitting and receiving commands and responses with the format provided by ISO/IEC7816 to and from host devices. ISO/IEC7816 also provides a format (referred to as "extended format") enables transmission and reception of data longer than that of the ordinary format. There are the cases where IC cards support the extended format, and the cases where IC cards do not support the extended format. There are also the cases where IC cards support the extended format of some commands and do not support the extended format of the other commands.

However, in ISO/IEC7816 and ISO/IEC14443, IC cards transmit only information as to whether the extended format is supported to the host device. Specifically, there is the problem that the host device cannot determine whether the extended format of which command is supported, even when the extended format of some commands is supported in IC cards.

DETAILED DESCRIPTION

According to an embodiment, an IC card includes a communication interface and a processor. The communication interface communicates with an IC card processing apparatus. The processor transmits extended format support information indicating whether an extended format is supported for each of commands to the IC card processing apparatus.

Embodiments will be explained hereinafter with reference to drawings.

Figure 1:
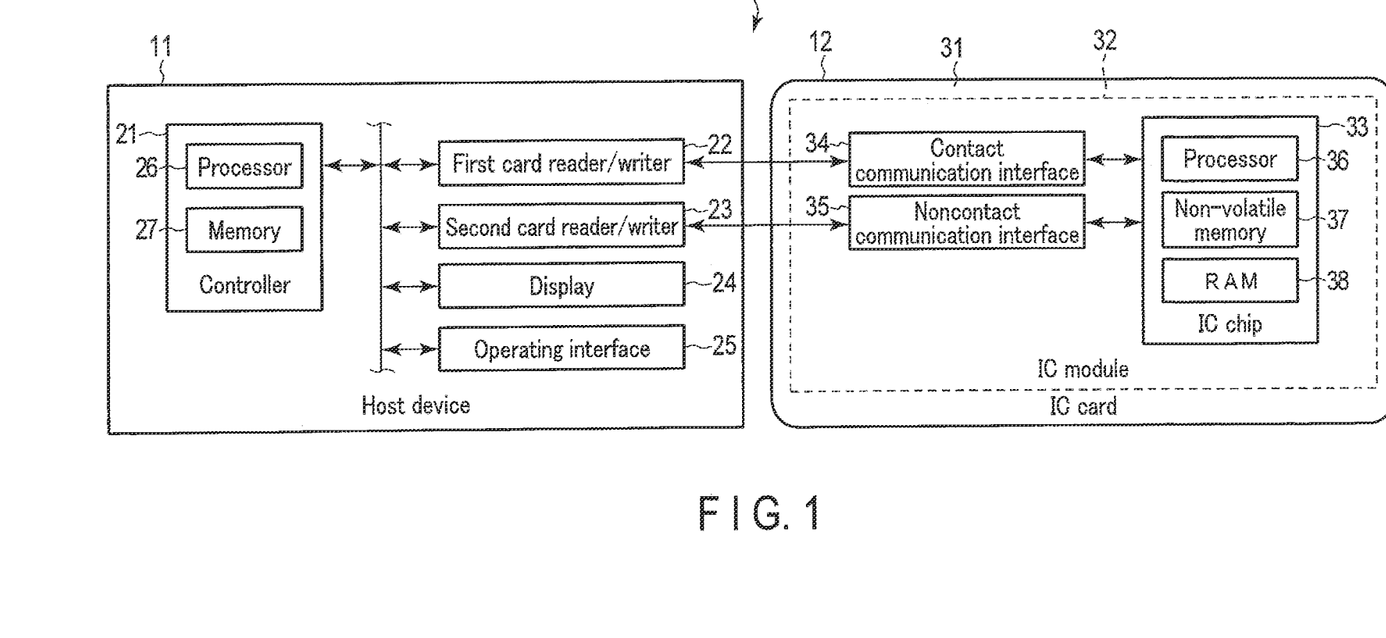
FIG. 1 is an explanatory drawing for explaining a configuration example of an IC card processing system according to an embodiment.

FIG. 1 is an explanatory drawing for explaining an example of an IC card processing system 1.

The IC card processing system 1 includes a host device 11 (IC card processing apparatus) and an IC card 12 (portable electronic device) and the like. The host device 11 and the IC card 12 are configured to be mutually communicatable in a contact or noncontact manner. The IC card processing system 1 may include any required constituent elements other than the constituent elements illustrated in FIG. 1, or any specific constituent elements may be excluded from the IC card processing system 1.

First, the following is an explanation of configuration of the host device 11.

The host device 11 is an IC card processing apparatus processing the IC card 12. The host device 11 controls the whole IC card processing system 1. The host device 11 activates the IC card 12 by supplying electric power to the IC card 12. The host device 11 causes the IC card 12 to execute various operations by transmitting various commands to the IC card 12.

The host device 11 includes a controller 21, a first card reader/writer 22, a second card reader/writer 23, a display 24, and an operating interface 25 and the like.

The controller 21 controls various operations of the host device 11. The controller 21 includes a processor 26 and a memory 27.

The processor 26 includes an arithmetic element (such as a CPU) executing arithmetic processing. The processor 26 executes various operations by executing programs stored in the memory 27.

The memory 27 is a non-transitory computer-readable storage medium, and stores programs and data used with the program and the like. The memory 27 includes, for example, a driver of the first card reader/writer 22, a driver of the second card reader/writer 23, a program for generating an image to be displayed on the display 24, and a program for interpreting an operation input executed with the operating interface 25. The memory 27 also includes a program for transmitting a command to the IC card 12 and receiving a response from the IC card 12. Specifically, the memory 27 stores a control program for an IC card processing apparatus processing the IC card 12.

The first card reader/writer 22 is an interface to execute contact communication with the IC card 12. The first card reader/writer 22 includes a plurality of contact terminals physically and electrically connected to a contact pattern of the IC card 12, and a slot in which the IC card 12 is inserted. The first card reader/writer 22 executes transmission and reception of data to and from the IC card 12 via the contact terminals and the contact pattern. The first card reader/writer 22 also supplies electric power and a clock to the IC card 12 via the contact terminals and the contact pattern.

The second card reader/writer 23 is an interface to execute noncontact communication with the IC card 12. The second card reader/writer 23 includes an antenna (coil) and a modulation/demodulation circuit. The second card reader/writer 23 modulates a signal corresponding to data to be transmitted with the modulation/demodulation circuit and lets the signal flow through the antenna to output radio waves corresponding to the data from the antenna. The second card reader/writer 23 also receives radio waves from the IC card with the antenna, and demodulates the received signal with the modulation/demodulation circuit to acquire the original data. The second card reader/writer 23 also supplies electric power to the IC card 12 with radio waves from the antenna.

The display 24 displays a picture on the basis of display data (screen data) supplied from the controller 21 or a graphics controller (not illustrated).

The operating interface 25 is a constituent element generating an operating signal on the basis of an operation. The operating interface 25 receives or generates an operating signal based on an operation of an operating member, such as a mouse, a trackball, a keyboard, a trackpad, and a touch sensor, and supplies the operating signal to the controller 21.

The example in FIG. 1 illustrates that the host device 11 has a structure including both the first card reader/writer 22 and the second card reader/writer 23, but it suffices that the host device 11 includes at least one of the first card reader/writer 22 and the second card reader/writer 23. As another example, the host device 11 may have the structure including a communication interface connected to the first card reader/writer 22 or the second card reader/writer 23.

The following is an explanation of configuration of the IC card 12.

The IC card 12 is activated by electric power supplied from the host device 11. The IC card 12 receives a command from the host device 11, and executes various types of processing in accordance with the received command. The IC card 12 also generates a response in accordance with the processing, and transmits the response to the host device 11.

The IC card 12 includes a card-like main body 31 formed of plastic or the like. The IC card 12 includes an IC module 32 in the main body 31. The IC module 32 includes an IC chip 33, a contact communication interface 34, and a non-contact communication interface 35. Specifically, the IC card 12 is a dual interface card including a contact communication interface 34 to execute contact communication with the host device 11 and a noncontact communication interface 35 to execute noncontact communication with the host device 11. The IC chip 33 also includes a processor 36, a non-volatile memory 37, and a RAM 38. The IC card 12 may include any necessary additional constituent elements other than the constituent elements illustrated in FIG. 1. Part of the constituent elements illustrated in FIG. 1 may be excluded from the IC card 12. For example, it suffices that the IC card 12 includes at least one of the contact communication interface 34 and the noncontact communication interface 35.

The processor 36 includes an arithmetic element (such as a CPU) executing arithmetic processing. The processor 36 executes various operations by executing programs stored in the non-volatile memory 37.

The non-volatile memory 37 is a non-transitory computer-readable storage medium, and a non-volatile memory storing programs and data used for the programs and the like. Examples of the programs stored in the non-volatile memory 37 include an OS (operating system) and applications to execute various types of processing according to the operating form of the IC card 12. The applications are, for example, IC card applications managed by the card issuer (issuer of the card). The OS is a program to cause the processor 36 to achieve control and information processing of each of the units in the IC card 12. The programs and the control data of the non-volatile memory 37 are incorporated in advance in accordance with the specifications of the IC card 12. The IC card 12 may include a ROM storing programs, such as an OS and applications.

In the non-volatile memory 37, a file structure provided by ISO/IEC7816 is formed. For example, a master file (MF), dedicated files (DF), and elementary files (EF) are stored in the non-volatile memory 37. A file structure based on the specifications of GlobalPlatform may be formed in the non-volatile memory 37. Specifically, the IC card 12 may be a JavaCard.

The MF is a file serving as the basis of the file structure.

The DFs are created in the lower layer of the MF. Each of the DFs is a file grouping and storing applications and data used for the applications.

The EFs are created in the lower layer of the DFs. Each of the EFs is a file to store various data. There are the cases where the EFs are placed directly under the MF.

The RAM 38 is a volatile memory temporarily storing data. The RAM 38 temporarily stores data being processed with the processor 36 and the program read from the non-volatile memory 37 and the like. For example, the RAM 38 functions as a calculation buffer, a reception buffer, and a transmission buffer. The calculation buffer is an area to temporarily retain results of various types of arithmetic processing executed with the processor 36 and the like. The reception buffer is an area to temporarily retain the command (command data) received from the host device 11 and the like. The transmission buffer is an area to temporarily retain a response (response data) to be transmitted to the host device 11 and the like.

Part of various functions achieved by execution of the program with the processor 36 may be incorporated as a hardware circuit in the IC chip 33. In this case, the processor 36 controls the function executed with the hardware circuit.

The contact communication interface 34 is contact communication means for executing contact communication with the host device 11. For example, the contact communication interface 34 includes a contact pattern connected to the terminal of the IC chip 33 and exposed to the surface of the IC card 12. The contact pattern is configured to be physically and electrically connected to the contact terminals when the IC card 12 is inserted in the slot of the first card reader-writer 22. The contact communication interface 34 relays electric power supply and transmission and reception of data between the host device 11 and the IC chip 33.

The noncontact communication interface 35 is noncontact communication means for executing noncontact communication with the host device 11. For example, the noncontact communication interface 35 includes an antenna (coil), a modulation/demodulation circuit, and a power supply circuit. The noncontact communication interface 35 modulates a signal corresponding to data to be transmitted with the modulation/demodulation circuit and lets the signal flow through the antenna to output radio waves corresponding to the data from the antenna. The noncontact communication interface 35 also receives radio waves from the second card reader/writer 23 of the host device 11 with the antenna and demodulates the received signal with the modulation/demodulation circuit to acquire the original data. The noncontact communication interface 35 also rectifies and smooths, with the power supply circuit, an induced current generated in the antenna with the radio waves from the second card reader/writer 23 of the host device 11, and supplies predetermined power supply voltage to the IC chip 33.

The following is an explanation of handling of the extended format in the host device 11 and the IC card 12.

The format of commands transmitted from the host device 11 to the IC card 12 is provided by ISO/IEC7816, and the commands have fields, such as "CLA", "INS", "P1", "P2", "Lc", "Data", and "Le". The fields "Lc", "Data", and "Le" may be omitted in some types of commands.

The field "CLA" is information indicating the type of the command. The field "INS" is information indicating the type of the command. The type of the command is indicated with the "CLA" and "INS".

Each of the fields "P1" and "P2" is information indicating parameters corresponding to "INS". Each of "P1" and "P2" indicates, for example, command option designation. For example, each of "P1" and "P2" indicates the ID of the file serving as the processing target.

The field "Lc" is information indicating the length (the number of bytes) of the data of "Data".

The field "Data" is information indicating the data main body of the command. The field "Data" stores, for example, data used in command processing based on the command.

The field "Le" is information indicating the data length (maximum length) of the response to the command.

The format of the response transmitted from the IC card 12 to the host device 11 is provided by ISO/IEC7816, and the response includes fields, such as "Data", "SW1", and "SW2". The field "Data" may be omitted in some types of responses.

The field "Data" is information indicating the data main body of the response. The field "Data" stores, for example, a processing result (such as read data) based on the command. The length of the field "Data" of the response is determined according to the field "Le" of the command.

Each of the fields "SW1" and "SW2" is information (status byte) indicating the processing result in the IC card 12. For example, the fields "SW1" and "SW2" report information "the processing was normally finished" and/or various errors and the like to the host device 11.

In the ordinary format, each of the fields "Lc" and "Le" of the command is formed of 1 byte. The maximum value of the length of the field "Data" in a command is 256 bytes being a length that can be expressed with "Lc". The maximum value of the length of the field "Data" in a response is 256 bytes being a length that can be expressed with "Le".

By contrast, in the extended format, each of the fields "Lc" and "Le" in the command can be formed of bytes of the number longer than 1 byte. The IC card 12 supporting such an extended format is capable of transmitting and receiving a command and a response having longer "Data".

The IC card 12 is formed of one of a structure supporting the extended format for all the commands, a structure not supporting (non-supporting) the extended format, and a structure supporting the extended format for some of the commands. The structure supporting the extended format for some of the commands indicates that the commands include commands for which the extended format is supported and commands for which no extended format is supported.

The IC card 12 stores extended format support information in the non-volatile memory 37 in advance. The extended format support information indicates whether the extended format is supported for each of command groups each including a plurality of types of commands. The IC card 12 transmits the extended format support information to the host device 11 to report the command for which the extended format is supported to the host device 11.

Figure 2:
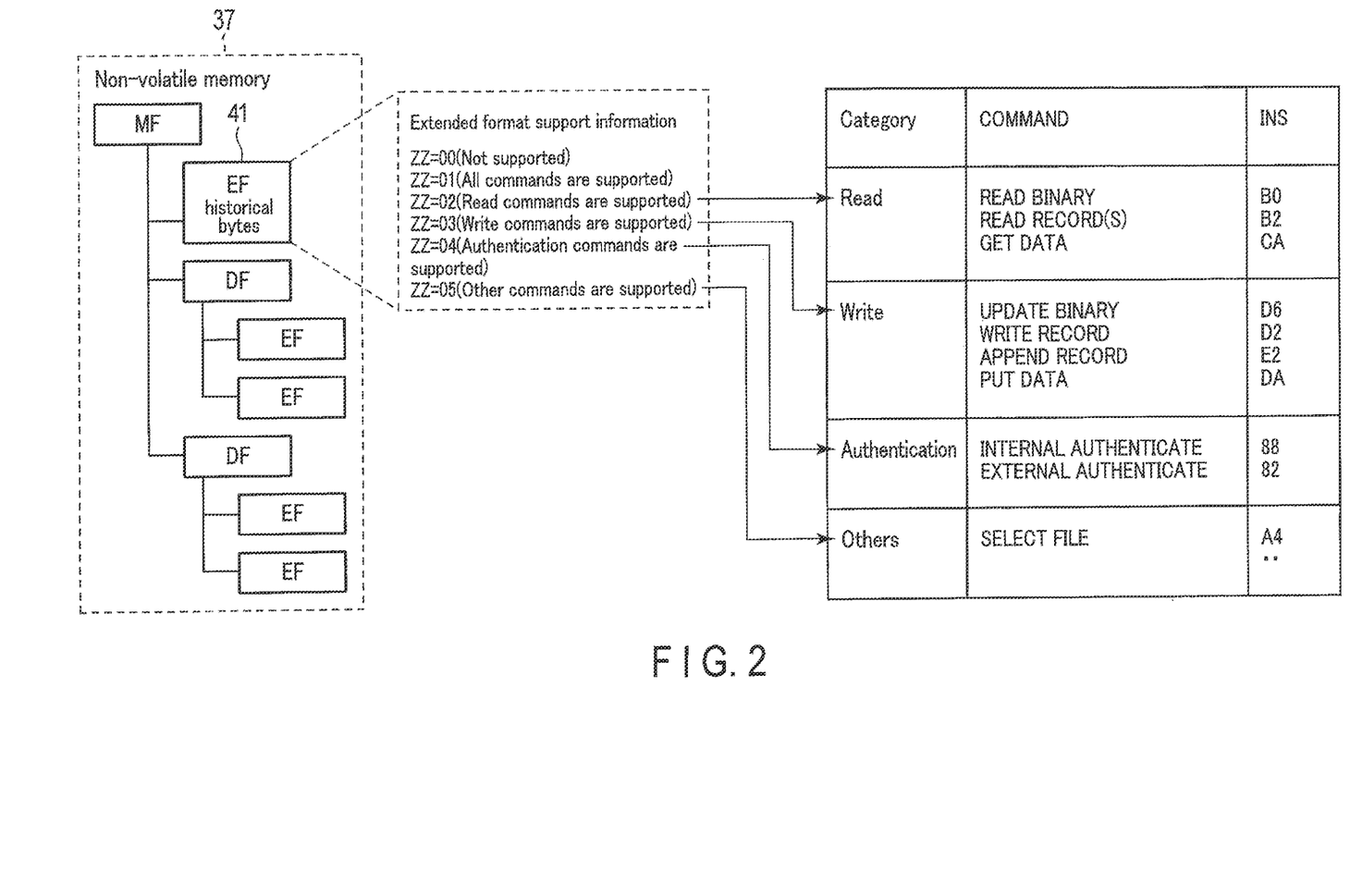
FIG. 2 is an explanatory drawing for explaining an example of extended format support information according to an embodiment.

FIG. 2 is an explanatory drawing for specifically explaining an example of the extended format support information.

The non-volatile memory 37 of the IC card 12 includes a storage area storing information relating to the characteristics of the card mainly including the card operating method for the IC card 12. The information relating to the characteristics of the card is, for example, historical bytes provided by ISO/IEC7816. The historical bytes include information, such as "issuer information", "card service data", and "card functions" and the like. The historical bytes in the present example also include "extended format support information".

In the example in FIG. 2, the historical bytes are stored in advance in a predetermined EF 41 (for example, EF ATR/INFO) in the lower layer of the MF. The historical bytes may be stored in, for example, an EF in the lower layer of the DF. The historical bytes may be stored in the non-volatile memory 37 in the form other than EF. For example, it suffices that the historical bytes are stored in any storage area in the non-volatile memory 37, in a state that the historical bytes are provided with a tag indicating that they are historical bytes.

In addition, the extended format support information may be individually stored in other EFs, not included in the historical bytes. As another example, it suffices that the extended format support information is stored in ay storage area in the non-volatile memory 37, in a state that the extended format support information is provided with a tag indicating that it is extended format support information.

The extended format support information is information indicating whether the extended format is supported, for each of command groups each including a plurality of types of commands. The extended format support information is formed as, for example, a value (ZZ) expressed with 1 byte. The value (ZZ) of the extended format support information is set in accordance with the specifications of the IC card 12 when the IC card 12 is issued or when the application is uprated.

As illustrated in FIG. 2, the extended format support information indicates one of "not supported (ZZ=00)", "all the commands are supported (ZZ=01)", "read commands are supported (ZZ=02)", "write commands are supported (ZZ=03)", "authentication commands are supported (ZZ=04)", and "other commands are supported (ZZ=05)", with the value of ZZ.

The read commands are commands (command group) including commands "READ BINARY", "READ RECORD (S)", and "GET DATA" provided by, for example, ISO/IEC7816. Specifically, when the extended format support information is "ZZ=02", the information indicates that the IC card 12 can use the extended format in the commands, such as "READ BINARY", "READ RECORD (S)", and "GET DATA".

The write commands are commands (command group) including commands "UPDATE BINARY", "WRITE RECORD (S)", "APPEND RECORD", and "PUT DATA" provided by, for example, ISO/IEC7816. Specifically, when the extended format support information is "ZZ=03", the information indicates that the IC card 12 can use the extended format in the commands, such as "UPDATE BINARY", "WRITE RECORD (S)", "APPEND RECORD", and "PUT DATA".

The authentication commands are commands (command group) including commands "INTERNAL AUTHENTICATE", and "EXTERNAL AUTHENTICATE" provided by, for example, ISO/IEC7816. Specifically, when the extended format support information is "ZZ=04", the information indicates that the IC card 12 can use the extended format in the commands, such as "INTERNAL AUTHENTICATE", and "EXTERNAL AUTHENTICATE".

The other commands are commands (command group) including commands "SELECT FILE" and the like provided by, for example, ISO/IEC7816. Specifically, when the extended format support information is "ZZ=05", the information indicates that the IC card 12 can use the extended format in the commands, such as "SELECT FILE".

In addition, the host device 11 includes information for analyzing the extended format support information. The information is stored in the memory 27 or the like in advance. The information for analyzing the extended format support information is information associating the value (ZZ) of the extended format support information with information indicating the extended format of which command group is supported. Specifically, the host device 11 includes information such as "not supported (ZZ=00)", "all the commands are supported (ZZ=01)", "read commands are supported (ZZ=02)", "write commands are supported (ZZ=03)", "authentication commands are supported (ZZ=04)", and "other commands are supported (ZZ=05)", stored in the memory 27 or the like in advance.

When the processor 26 of the host device 11 receives the extended format support information from the IC card 12, the processor 26 determines the extended format of which command group is supported on the basis of the value (ZZ) of the extended format support information.

For example, when the value of the extended format support information is "ZZ=00", the processor 26 determines that the support state of the extended format in the IC card 12 is "not supported". In this case, the processor 26 of the host device 11 transmits the command to the IC card 12 without using the extended format.

For example, when the value of the extended format support information is "ZZ=01", the processor 26 determines that the support state of the extended format in the IC card 12 is "all the commands are supported". In this case, the processor 26 of the host device 11 transmits the command to the IC card 12 using the extended format, if necessary.

For example, when the value of the extended format support information is "ZZ=02", the processor 26 determines that the support state of the extended format in the IC card 12 is "read commands are supported". In this case, the processor 26 of the host device 11 transmits the read command to the IC card 12 using the extended format, if necessary.

For example, when the value of the extended format support information is "ZZ=03", the processor 26 determines that the support state of the extended format in the IC card 12 is "write commands are supported". In this case, the processor 26 of the host device 11 transmits the write command to the IC card 12 using the extended format, if necessary.

For example, when the value of the extended format support information is "ZZ=04", the processor 26 determines that the support state of the extended format in the IC card 12 is "authentication commands are supported". In this case, the processor 26 of the host device 11 transmits the authentication command to the IC card 12 using the extended format, if necessary.

For example, when the value of the extended format support information is "ZZ=05", the processor 26 determines that the support state of the extended format in the IC card 12 is "other commands are supported". In this case, the processor 26 of the host device 11 transmits the command of other types to the IC card 12 using the extended format, if necessary.

The following is an explanation of processing in which the IC card 12 transmits the extended format support information to the host device 11.

First Embodiment

Figure 3:
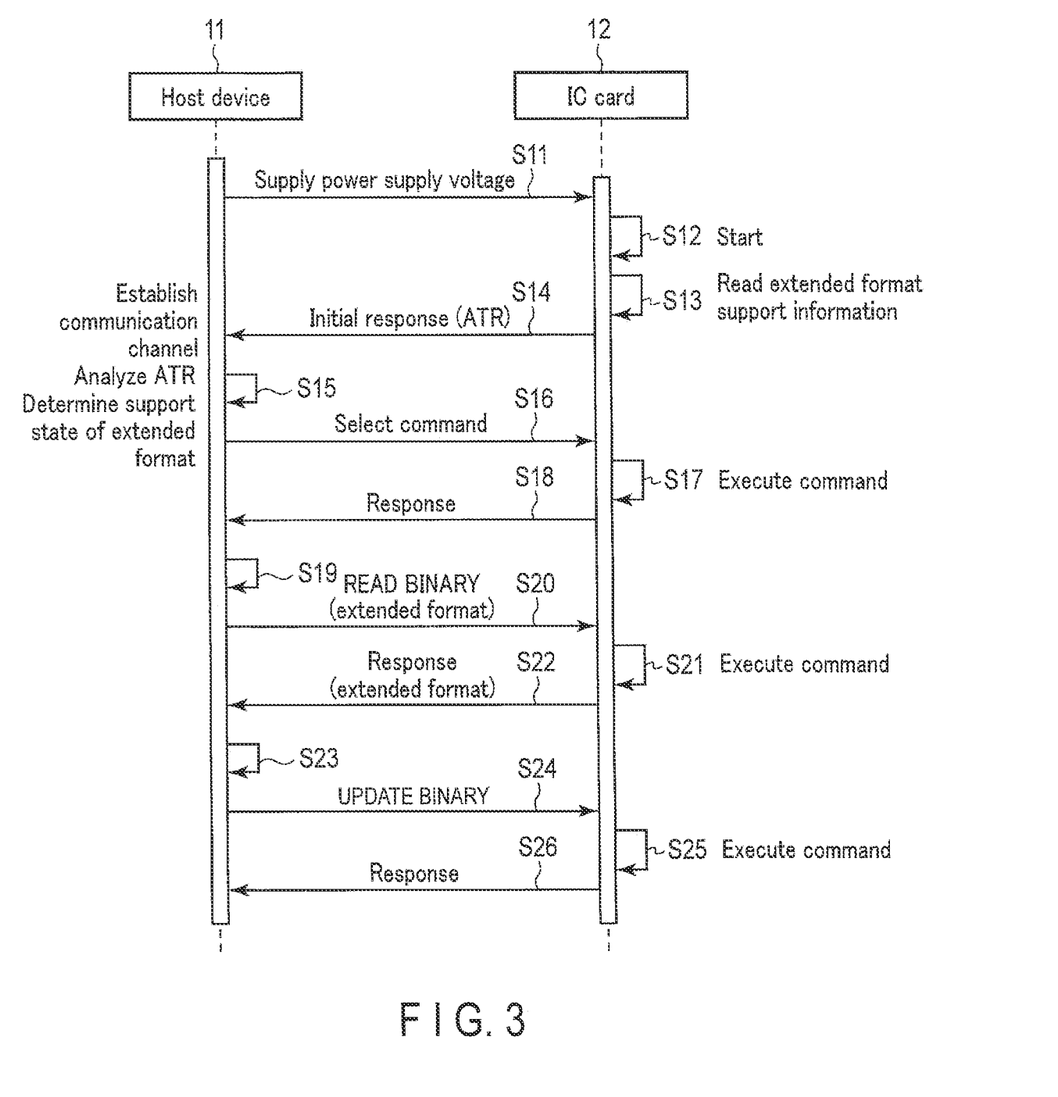
FIG. 3 is an explanatory drawing for explaining an example of operations of an IC card processing system according to a first embodiment.

FIG. 3 is a sequence diagram for explaining operations, such as activation of the IC card 12 and initial response, in the first embodiment. Contact communication will be explained hereinafter as an example. The present example will be explained on the supposition that the IC card 12 has a structure supporting the extended format of read commands (that is, the value of the extended format support information is "ZZ=02").

In contact communication, the host device 11 supplies a DC power supply voltage to the IC card 12 with the first card reader/writer 22 (Step S11).

The IC card 12 is activated (started) with the DC power supply voltage supplied from the host device 11 via the contact communication interface 34 (Step S12).

When the IC card 12 is started, the processor 36 of the IC card 12 executes initial response on the basis of the provision of ISO/IEC7816. For example, the processor 36 reads extended format support information from the non-volatile memory 37 (Step S13). The processor 36 transmits the read extended format support information to the host device 11 (Step S14).

Specifically, the processor 36 reads the historical bytes to execute initial response from the non-volatile memory 37. The historical bytes read from the non-volatile memory 37 include the extended format support information. The processor 36 generates an ATR (answer-to-reset) having a frame format provided by ISO/IEC7816-3. The processor 36 adds the historical bytes to the ATR. The processor 36 transmits the ATR to the host device 11. Specifically, when the processor 36 executes initial setting between the IC card 12 and the host device 11, the processor 36 transmits the extended format support information added to the initial response to reset to the host device 11.

When the processor 26 of the host device 11 receives the ATR from the IC card 12, the processor 26 analyzes the ATR, executes various settings for communication between the host device 11 and the IC card 12, and establishes a communication channel between the host device 11 and the IC card 12. The processor 26 of the host device 11 also checks the value (ZZ) of the extended format support information included in the historical bytes of the ATR.

The processor 26 of the host device 11 determines which command group supports the extended format in the IC card 12, on the basis of the value (ZZ) of the extended format support information (Step S15). After the step, the processor 26 of the host device 11 uses the extended format, if necessary, for the command for which the extended format is supported in the IC card 12.

For example, the processor 26 of the host device 11 determines whether to use the extended format according to the command to be transmitted to the IC card 12 or the contents of the response. Specifically, the processor 26 of the host device 11 determines using the extended format, when the "Data" of the command or the response to be transmitted to the IC card 12 does not fall within the ordinary format and the extended format is supported. The processor 26 of the host device 11 may be configured to always use the extended format to transmit the command when the extended format is supported.

The present example will be explained on the supposition that the value of the extended format support information from the IC card 12 is "ZZ=02". In this case, the host device 11 can use the extended format when the host device 11 transmits a read command to the IC card 12.

The processor 26 of the host device 11 transmits a select command to the IC card 12 after the communication channel is established (Step S16).

The processor 36 of the IC card 12 selects and executes the application in accordance with the select command from the host device 11 (Step S17). The processor 36 of the IC card 12 executes the application of the DF designated with the select command.

The processor 36 of the IC card 12 generates a response on the basis of a processing result for the select command, and transmits the response to the host device 11 (Step S18).

The processor 26 of the host device 11 recognizes the result of command processing in the IC card 12 on the basis of the response from the IC card 12 (Step S19).

Thereafter, when the processor 26 transmits a read command for which the extended format is supported to the IC card 12, the processor 26 of the host device 11 transmits a read command (such as "READ BINARY") with the extended format to the IC card 12 (Step S20).

Specifically, the processor 26 of the host device 11 transmits a command having the number of bytes forming "Le" and longer than the ordinary format to the IC card 12.

The processor 36 of the IC card 12 executes processing in accordance with the command "READ BINARY" from the host device 11 (Step S21). For example, the processor 36 of the IC card 12 reads the storage area on the non-volatile memory 37 designated with the command "READ BINARY", and generates a response in which the read data is set to the field "Data".

The processor 36 of the IC card 12 transmits the generated response to the host device 11 (Step S22).

The processor 26 of the host device 11 recognizes the result of command processing in the IC card 12 on the basis of the response from the IC card 12 (Step S23).

When a write command for which no extended format is supported is transmitted to the IC card 12, the processor 26 of the host device 11 transmits a write command (such as "UPDATE BINARY") of the ordinary format to the IC card 12 (Step S24).

The processor 36 of the IC card 12 executes processing on the basis of the command "UPDATE BINARY" from the host device 11 (Step S25). For example, the processor 36 of the IC card 12 writes the data set in the field "Data" of the command "UPDATE BINARY" to the storage area on the non-volatile memory 37 designated with the command "UPDATE BINARY", and generates a response on the basis of the processing result.

The processor 36 of the IC card 12 transmits the generated response to the host device 11 (Step S26).

The example of contact communication has been explained above, but the IC card 12 is capable of transmitting extended format support information to the host device 11 also in noncontact communication in the same manner. In noncontact communication, for example, the IC card 12 transmits an ATS (answer-to-select) serving as an initial response provided with the historical bytes to the host device 11 in the initial setting. The ATS is provided by ISO/IEC14443. Specifically, the processor 36 of the IC card 12 is capable of supplying extended format support information to the host device 11 by adding the extended format support information to the ATS and transmitting the ATS.

As described above, in the initial setting, the processor 36 of the IC card 12 reads the extended format support information indicating whether the extended format is supported for each of command groups each including a plurality of types of commands from the non-volatile memory 37. The processor 36 of the IC card 12 adds the extended format support information to the information to be transmitted to the host device 11. For example, the processor 36 of the IC card 12 adds the extended format support information to an initial response (ATR or ATS) to be transmitted to the host device 11. In this manner, the processor 36 of the IC card 12 is enabled to notify the host device 11 of the group of commands for which the extended format is supported. As a result, the processor 26 of the host device 11 is enabled to recognize the group of commands for which the extended format is supported, when some of commands support the extended format in the IC card 12.

In addition, as described above, the processor 26 of the host device 11 receives extended format support information indicating whether the extended format is supported for each of command groups each including a plurality of types of commands from the IC card 12. The processor 26 recognizes the command group for which the extended format is supported, on the basis of the extended format support information. In addition, the processor 26 switches the command to be transmitted between the extended format and the ordinary format. In this manner, the host device 11 is enabled to transmit a command using the extended format, if necessary, to the IC card 12. This structure enables improvement of efficiency of command response.

Second Embodiment

The following is an explanation of the second embodiment. The second embodiment is different from the first embodiment in that extended format support information is transmitted to the host device 11 in accordance with a read command from the host device 11, not in initial response. The same constituent elements as those of the first embodiment will be denoted by the same reference numerals as those of the first embodiment, and an overlapping explanation will be omitted.

Figure 4:
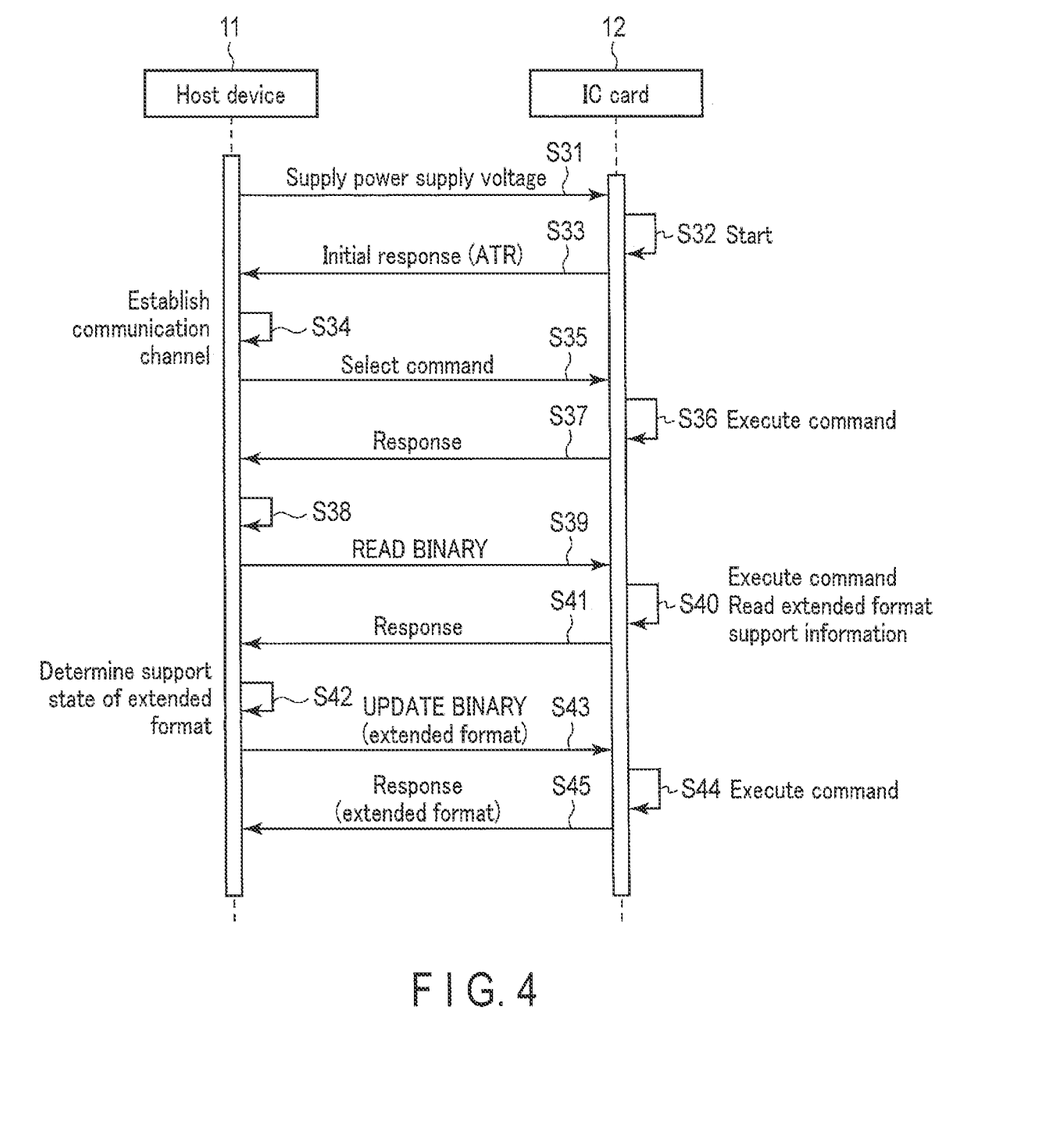
FIG. 4 is an explanatory drawing for explaining an example of operations of an IC card processing system according to a second embodiment.

FIG. 4 is a sequence diagram for explaining operations, such as activation of the IC card 12 and initial response, in the second embodiment. Contact communication will be explained hereinafter as an example. The present example will be explained on the supposition that the IC card 12 has a structure supporting the extended format of write commands (that is, the value of the extended format support information is "ZZ=03").

The host device 11 supplies a DC power supply voltage to the IC card 12 with the first card reader/writer 22 (Step S31).

The IC card 12 is activated (started) with the DC power supply voltage supplied from the host device 11 via the contact communication interface 34 (Step S32).

When the IC card 12 is started, the processor 36 of the IC card 12 executes initial response on the basis of the provision of ISO/IEC7816 (Step S33). Specifically, the processor 36 transmits an ATR to the host device 11.

When the processor 26 of the host device 11 receives the ATR from the IC card 12, the processor 26 analyzes the ATR, executes various settings for communication between the host device 11 and the IC card 12, and establishes a communication channel between the host device 11 and the IC card 12 (Step S34).

The processor 26 of the host device 11 transmits a select command to the IC card 12 after the communication channel is established (Step S35).

The processor 36 of the IC card 12 selects and executes the application in accordance with the select command from the host device 11 (Step S36). The processor 36 of the IC card 12 executes the application of the DF designated with the select command.

The processor 36 of the IC card 12 generates a response on the basis of a processing result for the select command, and transmits the response to the host device 11 (Step S37).

The processor 26 of the host device 11 recognizes the result of command processing in the IC card 12 on the basis of the response from the IC card 12 (Step S38).

Thereafter, to enable the extended format between the host device 11 and the IC card 12, the host device 11 transmits a command to acquire extended format support information from the IC card 12 to the IC card 12. For example, the processor 26 of the host device 11 transmits a read command (such as "READ BINARY") designating the storage area storing the extended format support information on the non-volatile memory 37 of the IC card 12 to the IC card 12 (Step S39). The read command designating the storage area storing the extended format support information may be any read command, such as "READ BINARY", "READ RECORD (S)" and "GET DATA".

The processor 36 of the IC card 12 executes processing in accordance with the command "READ BINARY" from the host device 11 (Step S40). For example, the processor 36 of the IC card 12 reads the extended format support information from the storage area on the non-volatile memory 37 designated with the command "READ BINARY", and generates a response in which the read data is set in the field "Data".

The processor 36 of the IC card 12 transmits the generated response to the host device 11 (Step S41).

The processor 26 of the host device 11 checks the value (ZZ) of the extended format support information included in the response from the IC card 12. The processor 26 of the host device 11 determines which command group supports the extended format in the IC card 12, on the basis of the value (ZZ) of the extended format support information (Step S42). After the step, the processor 26 of the host device 11 uses the extended format, if necessary, for the command for which the extended format is supported in the IC card 12.

The present example will be explained on the supposition that the value of the extended format support information from the IC card 12 is "ZZ=03". In this case, the host device 11 can use the extended format when the host device 11 transmits a write command to the IC card 12.

When the processor 26 transmits a write command for which the extended format is supported to the IC card 12, the processor 26 of the host device 11 transmits a write command (such as "UPDATE BINARY") of the extended format to the IC card 12 (Step S43). Specifically, the processor 26 of the host device 11 transmits a command having the number of bytes forming "Lc" and longer than the ordinary format to the IC card 12.

The processor 36 of the IC card 12 executes processing in accordance with the command "UPDATE BINARY" from the host device 11 (Step S44). For example, the processor 36 of the IC card 12 writes data set in the field "Data" of the command "UPDATE BINARY" to the storage area on the non-volatile memory 37 designated with the command "UPDATE BINARY", and generates a response in accordance with the processing result.

The processor 36 of the IC card 12 transmits the generated response to the host device 11 (Step S45).

As described above, in accordance with the read command, the processor 36 of the IC card 12 reads the extended format support information indicating whether the extended format is supported for each of command groups each including a plurality of types of commands from the non-volatile memory 37. The processor 36 of the IC card 12 adds the extended format support information to the response to the read command, and transmits the response to the host device 11. In this manner, the processor 36 of the IC card 12 is enabled to notify the host device 11 of the group of commands for which the extended format is supported. As a result, the processor 26 of the host device 11 is enabled to recognize the group of commands for which the extended format is supported, when some of commands support the extended format in the IC card 12.

Third Embodiment

The following is an explanation of the third embodiment. The third embodiment is different from the first embodiment and the second embodiment in that extended format support information is transmitted to the host device 11 in accordance with a select command from the host device 11. The same constituent elements as those of the first embodiment and the second embodiment will be denoted by the same reference numerals as those of the first embodiment and the second embodiment, and an overlapping explanation will be omitted.

The IC card 12 and the host device 11 in the third embodiment establish a communication channel by executing the processing at Step S31 to Step S34 in FIG. 4 illustrating the second embodiment.

After the communication channel is established, the processor 26 of the host device 11 transmits a select command to the IC card 12.

The processor 36 of the IC card 12 selects and executes the application in accordance with the select command from the host device 11. The processor 36 of the IC card 12 executes the application of the DF designated with the select command.

The processor 36 of the IC card 12 also reads extended format support information from the non-volatile memory 37 in accordance with the select command from the host device 11. The processor 36 generates a response on the basis of a processing result for the select command, and transmits the response to the host device 11. Specifically, the processor 36 transmits, to the host device 11, a response in which the values of "SW1" and "SW2" are set on the basis of the processing result for the select command and the read extended format support information is set to the field "Data".

The processor 26 of the host device 11 recognizes the result of command processing in the IC card 12 on the basis of the response from the IC card 12. In addition, the processor 26 of the host device 11 checks the value (ZZ) of the extended format support information included in the response from the IC card 12. The processor 26 of the host device 11 determines which command group supports the extended format in the IC card 12, on the basis of the value (ZZ) of the extended format support information. After the step, the processor 26 of the host device 11 uses the extended format, if necessary, for the command for which the extended format is supported in the IC card 12.

As described above, in accordance with the select command, the processor 36 of the IC card 12 reads the extended format support information indicating whether the extended format is supported for each of command groups each including a plurality of types of commands from the non-volatile memory 37. The processor 36 of the IC card 12 adds the extended format support information to the response to the select command, and transmits the response to the host device 11. In this manner, the processor 36 of the IC card 12 is enabled to notify the host device 11 of the group of commands for which the extended format is supported. As a result, the processor 26 of the host device 11 is enabled to recognize the group of commands for which the extended format is supported, when some of commands support the extended format in the IC card 12.

Third Embodiment

The first embodiment has been explained with the structure in which the extended format support information indicates one of "not supported (ZZ=00)", "all the commands are supported (ZZ=01)", "read commands are supported (ZZ=02)", "write commands are supported (ZZ=03)", "authentication commands are supported (ZZ=04)", and "other commands are supported (ZZ=05)", with the value of ZZ, but the structure is not limited thereto. The extended format support information may be configured to indicate the command for which the extended format is supported, with a bit image (bit string) forming the value of ZZ, not the value of ZZ.

Figure 5:
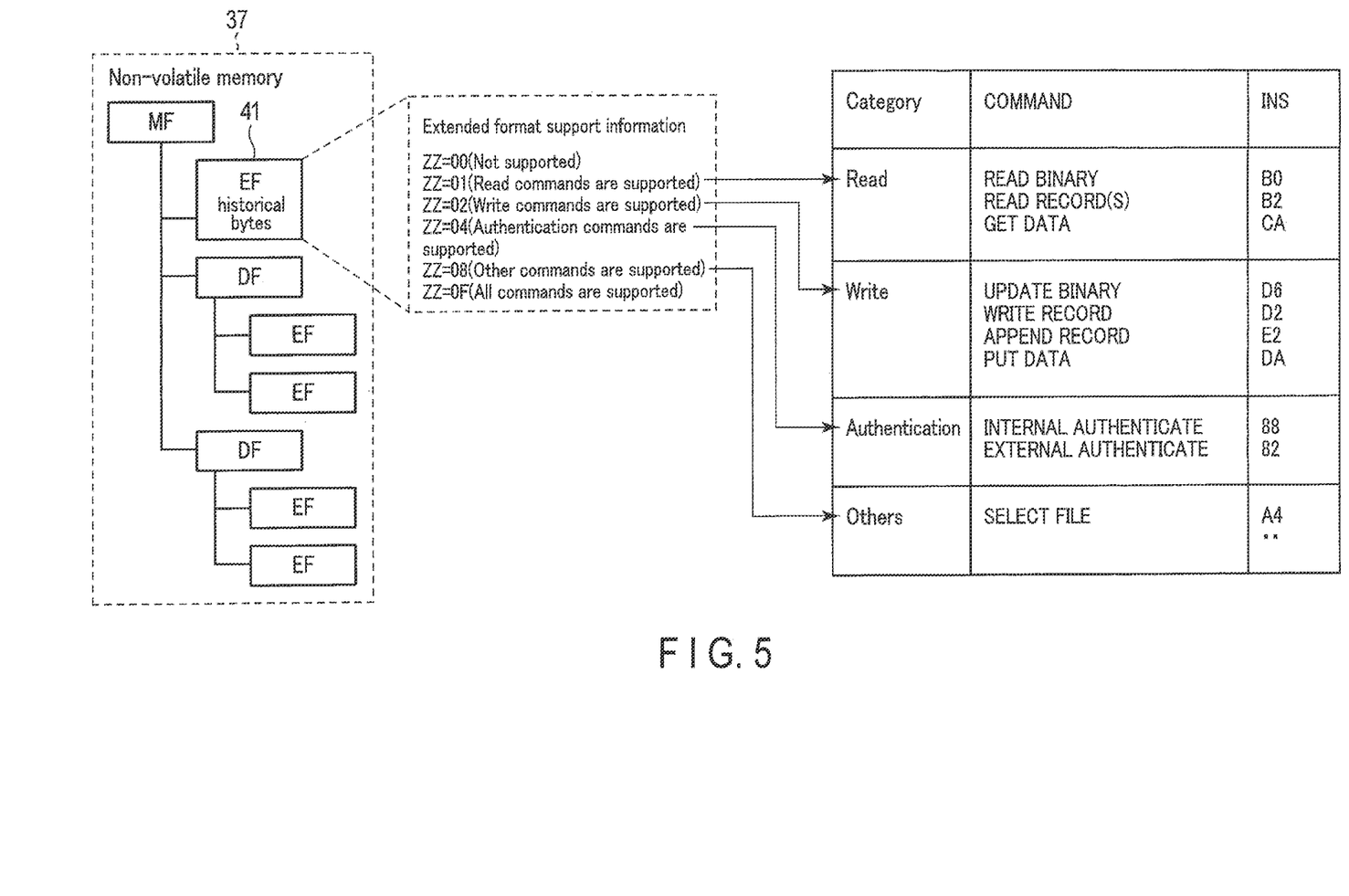
FIG. 5 is an explanatory drawing for explaining an example of extended format support information according to a third embodiment.

FIG. 5 is an explanatory drawing for explaining an example of extended format support information according to the third embodiment. In the example of FIG. 5, the extended format support information indicates "not supported (ZZ=00)", "read commands are supported (ZZ=01)", "write commands are supported (ZZ=02)", "authentication commands are supported (ZZ=04)", "other commands are supported (ZZ=08)", and "all the commands are supported (ZZ=0F)", with the value of ZZ.

When "ZZ=00" is expressed with a bit string, "ZZ=00" is "00000000".

When "ZZ=01" is expressed with a bit string, "ZZ=01" is "00000001".

When "ZZ=02" is expressed with a bit string, "ZZ=02" is "00000010".

When "ZZ=04" is expressed with a bit string, "ZZ=04" is "00000100".

When "ZZ=08" is expressed with a bit string, "ZZ-08" is "00001000".

When "ZZ=0F" is expressed with a bit string, "ZZ=0F" is "00001111".

Specifically, the first bit in the eight bits indicates whether read commands are supported.

The second bit in the eight bits indicates whether write commands are supported.

The third bit in the eight bits indicates whether authentication commands are supported.

The fourth bit in the eight bits indicates whether other commands are supported.

Specifically, when the fourth bit to the first bit are "0", it indicates that the support state is "not supported". When the fourth bit to the first bit are "1", it indicates that the support state is "all the commands are supported".

In addition, in the structure described above, the processor 36 of the IC card 12 sets the bit string of ZZ in accordance with the supported command group, and transmits it to the host device 11. In this manner, the IC card 12 is enabled to notify the host device 11 that the extended format is supported in a plurality of command groups.

For example, when read commands and write commands are supported in the IC card 12, the processor 36 of the IC card 12 sets the bit string of ZZ to "00000011", and transmits it to the host device 11. Also in this case, the processor 36 of the IC card 12 adds the extended format support information to an initial response to be transmitted to the host device 11 or a response to the command.

The processor 26 of the host device 11 includes information for analyzing the extended format support information structured as described above. The information is stored in the memory 27 or the like in advance. The host device 11 analyzes the extended format support information received from the IC card 12 and having the bit string "00000011" using the information for analyzing the extended format support information. In this manner, the host device 11 is enabled to recognize that read commands and write commands are supported in the IC card 12.

As described above, the processor 36 of the IC card 12 may be configured to notify the host device 11 of a plurality of supported command groups with the bit string forming the extended format support information, not indicating the supported command groups with the value of the extended format support information. As another example, the processor 36 of the IC card 12 may notify the host device 11 of a plurality of supported command groups with the bit string forming the extended format support information

Fourth Embodiment

The first embodiment illustrates that the IC card 12 has a structure in which the non-volatile memory 37 stores extended format support information indicating whether the extended format is supported for each of command groups (command groups) each including a plurality of types of commands. However, the IC card 12 is not limited to the structure described above. The IC card 12 may have a structure in which the non-volatile memory 37 stores extended format support information indicating whether the extended format is supported for each of types of commands (that is, for each of different commands). In this case, the extended format support information may be formed of data having the number of bytes longer than 1 byte, not 1 byte.

Figure 6:
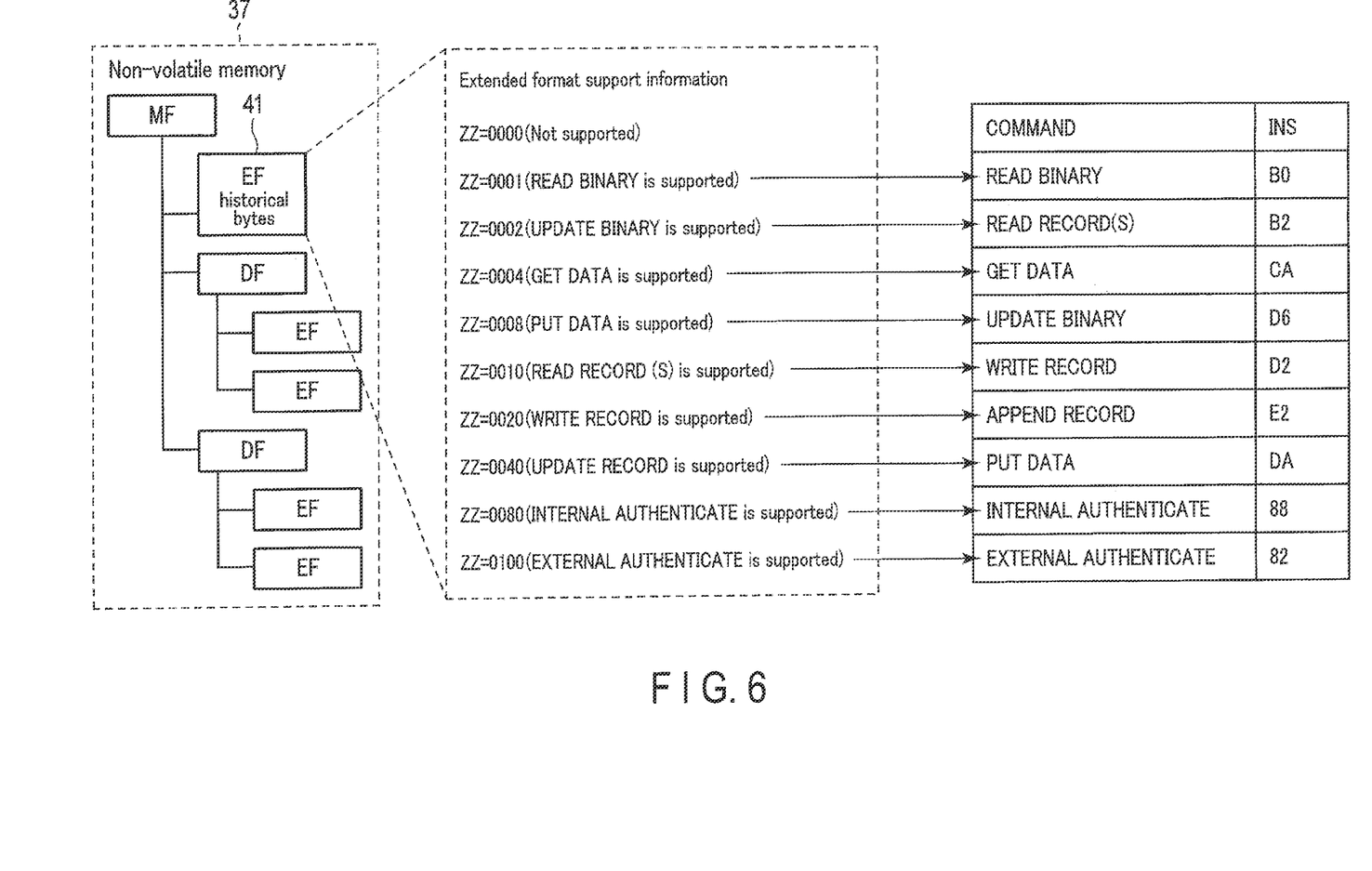
FIG. 6 is an explanatory drawing for explaining an example of extended format support information according to a fourth embodiment.

FIG. 6 is an explanatory drawing for explaining an example of extended format support information according to the fourth embodiment. In the example of FIG. 6, extended format support information is formed of data of 2 bytes (16 bits). In addition, the values of ZZ of the extended format support information are associated with commands for each of which the extended format is supported.

Specifically, the respective values of ZZ indicate "not supported (ZZ=0000)", "READ BINARY is supported (ZZ=0001)", "UPDATE BINARY is supported (ZZ=0002)", "GET DATA is supported (ZZ=0004)", "PUT DATA is supported (ZZ=0008)", "READ RECORD (S) is supported (ZZ=0010)", "WRITE RECORD is supported (ZZ=0020)", "UPDATE RECORD is supported (ZZ=0040)", "INTERNAL AUTHENTICATE is supported (ZZ=0080)", and "EXTERNAL AUTHENTICATE is supported (ZZ=0100)".

In the structure described above, the processor 36 of the IC card 12 sets the value of ZZ in accordance with the supported command group, and transmits it to the host device 11. Also in this case, the processor 36 of the IC card 12 adds the extended format support information to an initial response to be transmitted to the host device 11 or a response to the command. In this manner, the IC card 12 is enabled to notify the host device 11 of the command for which the extended format is supported.

The host device 11 includes information for analyzing the extended format support information configured as described above. The information is stored in the memory 27 or the like in advance. The host device 11 is enabled to recognize the command for which the IC card 12 supports the extended format using the information for analyzing the extended format support information, in accordance with the value of ZZ received from the IC card 12.

In addition, in the same manner as the fourth embodiment, the processor 36 of the IC card 12 may be configured to notify the host device 11 of a plurality of commands for which the extended format is supported, with the bit string forming ZZ of the extended format support information.

Also in this case, the processor 36 of the IC card 12 adds the extended format support information to an initial response to be transmitted to the host device 11 or a response to the command. In this manner, the processor 36 of the IC card 12 is enabled to notify the host device 11 of the type of the command for which the extended format is supported.

The embodiment described above illustrates that the extended format support information is information indicating whether the extended format is supported for each of command groups classified into "read commands", "write commands", "authentication commands", and "other commands" and the like, but the structure is not limited thereto. Classification of command groups is not limited to the example described above, but can be set as desired. As another example, classification of command groups may be defined on the application.

The functions explained in the embodiments described above are not only formed using hardware but also can be achieved by causing a computer to read programs describing the functions using software. Each of the functions may be formed of one of software and hardware selected properly.

While certain embodiments have been described, these embodiments have been presented by way of example only, and are not intended to limit the scope of the invention. These new embodiments can be implemented in various other forms. Various omissions, replacements, and changes can be made without departing from the spirit of the invention. The accompanying claims and their equivalents are intended to cover such forms or modifications as would fall within the scope and spirit of the inventions.

The invention claimed is:

1. An IC card activated by electric power supplied from an IC card processing apparatus comprising:
   a communication interface receiving electric power supplied from the IC card processing apparatus and communicating with the IC card processing apparatus;
   a non-volatile memory storing extended format support information of the IC card, wherein the extended format support information indicates whether an extended format is supported for each of commands, and the extended format is longer than an ordinary format; and
   a processor reading the extended format support information stored in the non-volatile memory, and transmitting the extended format support information to the IC card processing apparatus.

2. The IC card according to claim 1, wherein the processor transmits the extended format support information indicating whether the extended format is supported for each of command groups each including a plurality of types of commands to the IC card processing apparatus.

3. The IC card according to claim 2, wherein the command groups are formed of a read command group, a write command group, an authentication command group, and an other command group.

4. The IC card according to claim 3, wherein
   the read command group includes at least READ BINARY, READ RECORD, and GET DATA,
   the write command group includes at least UPDATE BINARY, WRITE RECORD, APPEND RECORD, AND PUT DATA, and
   the authentication command group includes at least INTERNAL AUTHENTICATE and EXTERNAL AUTHENTICATE.

5. The IC card according to claim 1, wherein the extended format support information further indicates whether the extended format of all the commands are supported and whether no extended format of all the commands are supported.

6. The IC card according to claim 1, wherein the processor adds the extended format support information to an initial response transmitted to the IC card processing apparatus when initial setting is executed between the IC card and the IC card processing apparatus.

7. The IC card according to claim 1, wherein the processor reads the extended format support information from the non-volatile memory in accordance with a read command from the IC card processing apparatus, and adds the read extended format support information to a response to the read command.

8. The IC card according to claim 1, wherein the processor selects an application in accordance with a select command from the IC card processing apparatus, reads the extended format support information from the non-volatile memory, and adds the read extended format support information to a response to the select command.

9. An IC card processing system comprising an IC card and an IC card processing apparatus processing the IC card,
   the IC card activated by electric power supplied from the IC card processing apparatus including:
      a communication interface receiving electric power supplied from the IC card processing apparatus and communicating with the IC card processing apparatus;
      a non-volatile memory storing extended format support information of the IC card, wherein the extended format support information indicates whether an extended format is supported for each of commands, and the extended format is longer than an ordinary format; and
      a processor reading the extended format support information stored in the non-volatile memory, and transmitting the extended format support information to the IC card processing apparatus,
   the IC card processing apparatus including:
      a card reader/writer (communication interface) communicating with the IC card; and
      a processor switching, for each of commands, whether to use the extended format, on the basis of the extended format support information from the IC card.

10. A non-transitory computer-readable storage medium storing a program to cause a computer to execute:
    receiving extended format support information indicating whether an extended format is supported for each of commands from an IC card activated by electric power supplied from an IC card processing apparatus, wherein the extended format is longer than an ordinary format; and
    switching, for each of the commands, whether to use the extended format, on the basis of the extended format support information.

* * * * *